United States Patent [19]
Gittinger et al.

[11] Patent Number: 5,781,492
[45] Date of Patent: Jul. 14, 1998

[54] SYSTEM AND METHOD FOR MAPPING MEMORY TO DRAM AFTER SYSTEM BOOT FROM NON-VOLATILE MEMORY

[75] Inventors: Robert P. Gittinger; Ronald W. Stence; John P. Hansen, all of Austin, Tex.

[73] Assignee: Advanced Micro Devices, Inc.

[21] Appl. No.: 808,609

[22] Filed: Feb. 4, 1997

[51] Int. Cl.⁶ .................................................. G11C 13/00
[52] U.S. Cl. .............................. 365/230.01; 365/230.03
[58] Field of Search ................. 365/230.01, 230.03, 365/189.01, 230.06

[56] References Cited

U.S. PATENT DOCUMENTS 5,687,125  11/1997  Kikuchi .

*Primary Examiner*—Terrell W. Fears
*Attorney, Agent, or Firm*—Kevin L. Daffer; Conley, Rose & Tayon

[57] ABSTRACT

A computer system is presented having a mechanism for re-mapping memory address space after system initiation. The mechanism includes a microcontroller embodying an integrated RAM controller and chip select unit. Select logic chooses between output from the chip select unit or output from the RAM controller, depending upon the state of memory chip select registers. The registers are set based upon whether a portion of the memory address space comprises ROM. If the space comprises ROM, then chip select signals are selected. After system initiation, data within ROM can be copied to a RAM, or loaded over a local or distal network, and the select logic chooses RAM controller output to operate the RAM.

17 Claims, 3 Drawing Sheets

SYSTEM AND METHOD FOR MAPPING MEMORY TO DRAM AFTER SYSTEM BOOT FROM NON-VOLATILE MEMORY

BACKGROUND OF THE INVENTION

1. Field of the Invention

This invention relates to a computer system and, more particularly, to an integrated microcontroller which can re-map a memory address space subsequent to a reset of the computer system. The re-mapped address space provides more optimal read/write use of that space.

2. Description of Related Art

A typical computer system includes an address bus comprising a series of address lines. Signals on the address lines are decoded to access data within a memory. The data being addressed resides within an address space possibly bifurcated into numerous elements (blocks or chips). The task of address decoding is therefore not only to select a defined memory space, but also to select a memory element among the other memory elements.

The memory elements being selected can be from different memory types and of different memory sizes. For example, the address space can comprise one or more read only memory (ROM) elements in conjunction with one or more read/write memory (RAM) elements. The address bus is decoded by the ROM or the RAM, depending upon which is selected.

ROM elements are generally more complex and, therefore, more expensive to manufacture. Additionally, programmable ROM elements cannot be accessed as fast as modern RAM. Addressing a ROM is generally concerns connecting $\overline{CE}$ (CE bar) to the chip select signal output from the address decoder. Bus timing is provided by a $\overline{READ}$ (READ bar) signal forwarded to the $\overline{OE}$ (OE bar) input of the ROM. No control signals are needed to gate the signal. Instead, read occurs whenever the ROM is enable via chip select. Static RAM (SRAM) timing follows somewhat the addressing scheme used for a ROM in that chip select is used in conjunction with a READ bar and WRITE bar signals. Conversely, dynamic RAM (DRAM) requires control signals forwarded to both the row address and column address. The row address must be driven prior to a $\overline{RAS}$ ("RAS bar") assertion. Subsequently, the row address inputs are changed to column address, and $\overline{CAS}$ ("CAS bar") is asserted. It is noted that at least one difference between ROM and DRAM is that ROM access occurs whenever a chip select is presented to that ROM. Conversely, DRAM typically does not require chip select. Instead, DRAM is selected whenever an address is properly timed in accordance with RAS bar and CAS bar.

In many computer system designs, a microcontroller is used to interface with the various memory elements. A popular microcontroller is the Am186 designed, produced and marketed by Advanced Micro Devices, Inc. The Am186 reserves twenty address lines for accessing a flash programmable ROM (PROM) and an SRAM. The PROM and SRAM are selected with respective chip select signals. Additional PROM and SRAM memory elements can be accommodated by utilizing additional chip select signals. Accordingly, Am186 microcontroller dispatches an upper chip select (UCS), a lower chip select (LCS) and, depending upon the additional PROM and SRAM elements, allows for additional chip selects MCS0–MCS3, etc. The upper chip select is used to select non-volatile data within the PROM, that data being addressable at the top of the memory address space and, preferably, being needed to boot the computer system during a power-on reset.

Like all microcontrollers, the Am186 accommodates a limited number of address lines. In the above example, a $2^{20}$ address space is available, presenting a maximum one Mbyte memory space. A problem exists, however, after the boot code within the ROM is exercised. That is, after system boot-up, the upper address space dedicated to ROM is limited in its use. Specifically, that space can only be read from as opposed to being read and written to. It would be desirable to reconfigure the microcontroller so that the limited addressing space can be more optimally organized. The desirous microcontroller is therefore one which can re-map the address space after system boot-up so that more space is available to RAM. Instead of sacrificing space to ROM, which is useless after boot up, an improvement is needed to re-configure the chip select signals forwarded from the microcontroller to control signals suitable for DRAM control and/or SRAM control.

SUMMARY OF THE INVENTION

The problems outlines above are in large part solved by an improved microcontroller hereof. The microcontroller is one which can dispatch an upper chip select signal (UCS) to the upper memory address space occupied by a ROM during initiation of the computer system. Concurrent with ROM access, a lower memory address space occupied by a RAM is active. The BIOS, boot code, and/or basic applications code within the ROM upper address space can then be copied to the pre-active lower address space. According to one embodiment, the lower address space is DRAM, and there is possibly a pair of DRAM elements accessible by the microcontroller after system initiation. Thus, the microcontroller offers a RAM controller integrated therein for randomly accessing data within the pair of RAM elements. By moving initiation code within the ROM element to address space within the RAM lower address space, the present microcontroller can deactivate the ROM and essentially re-allocate a substantial portion of the address space to the RAM upper address space. According to one embodiment, the RAM controller is a DRAM controller, and the mapped-to elements are exclusively DRAM. Re-mapping to DRAM provides a more optimal memory arrangement not in that they can be read-modified but also are rendered more cost effective since it is known that DRAM is significantly cheaper to manufacture than similarly sized flash PROM or SRAM.

Broadly speaking, the present invention contemplates a computer system. The computer system includes a non-volatile memory (preferably ROM) containing a program to initiate the computer system. A chip select unit is also included, and is coupled to dispatch a chip select signal to the non-volatile memory during initiation of the computer system. A pair of random access memory (RAM) devices are further included, one of which receives a copy of at least a portion of the program after initiation. According to one configuration, RAM can be loaded with the program from a remote site over, for example, a network. A random access memory controller is coupled between the chip select unit and the non-volatile memory as well as between the chip select unit and the random access memory devices. Select logic, preferably within the memory controller section, deactivates the chip select signal to the non-volatile memory device while activating row and column control signals emanating from the memory controller to the upper RAM device during a time after which the lower memory RAM device receive a copy of the initiation program.

The present invention yet further contemplates a method for re-mapping memory within a computer system. The method includes booting the computer system from a non-volatile memory. At least a portion of the data from the non-volatile memory is then copied (or downloaded) to a portion of a lower mapped address space of a random access, volatile memory (i.e., RAM and/or DRAM). The non-volatile memory is then disabled, and the row and column address signals are asserted to the upper mapped address space.

BRIEF DESCRIPTION OF THE DRAWINGS

Other objects and advantages of the invention will become apparent upon reading the following detailed description and upon reference to the accompanying drawings in which.

Figure 1:
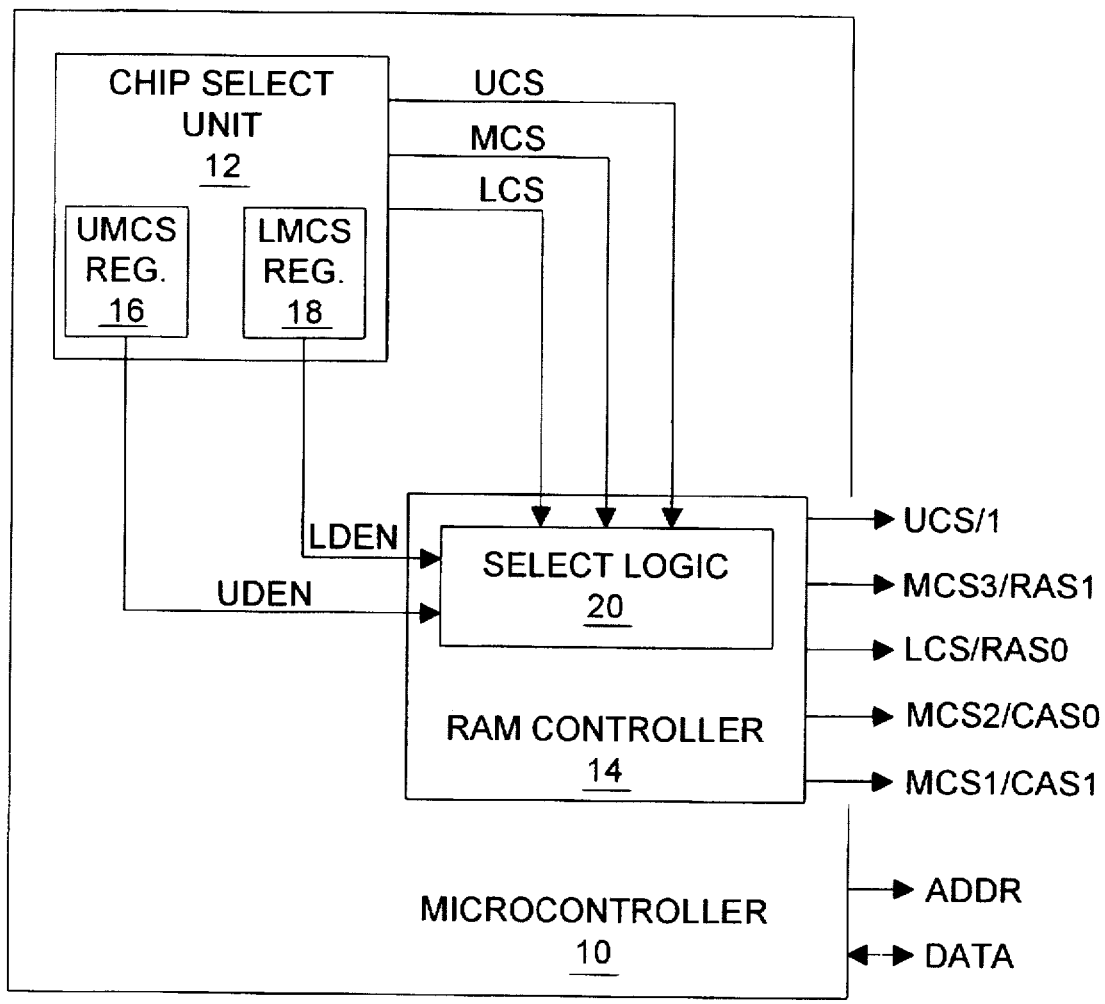
FIG. 1 is a block diagram of a microcontroller according to a preferred embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a microcontroller 10. Microcontroller 10 includes a chip select unit 12 and a DRAM controller integrated on the same monolithic substrate. Chip select unit functions as a decoder for dispatching a decoded chip select signal in response to address signals forwarded thereto. The decoded chip select signals are shown, according to one example, to include an upper chip select (UCS), multiple middle chip selects (MCS0–3), and a lower chip select (LCS). The address signals (not shown) used to select a given chip select can, according to one example, comprise a portion of the allotted address signals used by microcontroller 10. The various chip selects shown in FIG. 1 are slated for particular memory devices so those devices can be chosen in conjunction with the address placed on that device. The chip select signals are significant if the memory devices are non-volatile. However, if the memory devices are DRAM, then chip select is not required. In instances where DRAM is used, the chip select signals can be deasserted and DRAM control signals asserted as will be described below.

Chip select unit 12 includes programmable registers, two of which are shown. An upper memory chip select register (UMCS register) 16 is preferably a 16-bit register having one bit which is programmed either to a logic one value or a logic zero value. The programmed bit is referenced as upper chip select DRAM enable (UDEN) bit. According to a preferred embodiment, bit six of the 16-bit register is reserved for the UDEN bit. Also included within chip select unit 12 is a lower memory chip select register (LMCS register) 18. Similar to register 16, register 18 reserves a bit for enabling a DRAM device, albeit a different DRAM device than that enabled by UDEN. Register 18 preferably reserves bit six of a 16-bit register for a lower chip select DRAM enable (LDEN) bit. If UDEN or LDEN are programmed to a logic 1 value, then select unit 20 will respond with a DRAM enable (i.e., control) selection at the output of DRAM controller 14.

Select logic 20 can either be confined within the area reserved for DRAM controller 14, or be separate from DRAM controller 14 within the monolithic substrate encompassed by microcontroller 10. According to one embodiment, select logic 20 is shown as a portion of controller 14; however, it is noted that in many instances this need not be the case.

Depending upon the logic value of UDEN and LDEN bits, output from DRAM controller 14 changes. If the UDEN logic value is one, then select logic fixes UCS to a logic one value. Further, select unit 12 deactivates the chip select signals and, instead, RAM controller 14 initiates RAS1, CAS0 and CAS1 according to a DRAM controller embodiment. If UDEN and LDEN are at logic 0 value, then UCS, MCS3, LCS, MCS2 and MCS1 remain as the standard output from microcontroller 10. Accordingly, select logic 20, and the value of UDEN and LDEN determine change to the address space, from non-volatile memory space to, if desired, entirely volatile memory space. Values for UDEN and LDEN are programmed either in software or hardware within registers 16 and 18, respectively. During power-on reset, the values are preferably set to logic 0. It is the intent that, after power-on reset and copying data from non-volatile to volatile memory, that a maximum capacity of DRAM will be available. Preferably, the entire memory address space after reset if occupied by read/write (RAM or DRAM) memory. The mechanism for allocating the re-mapped memory space, and for performing selection to that space are described in reference to FIGS. 2 and 3.

Figure 2:
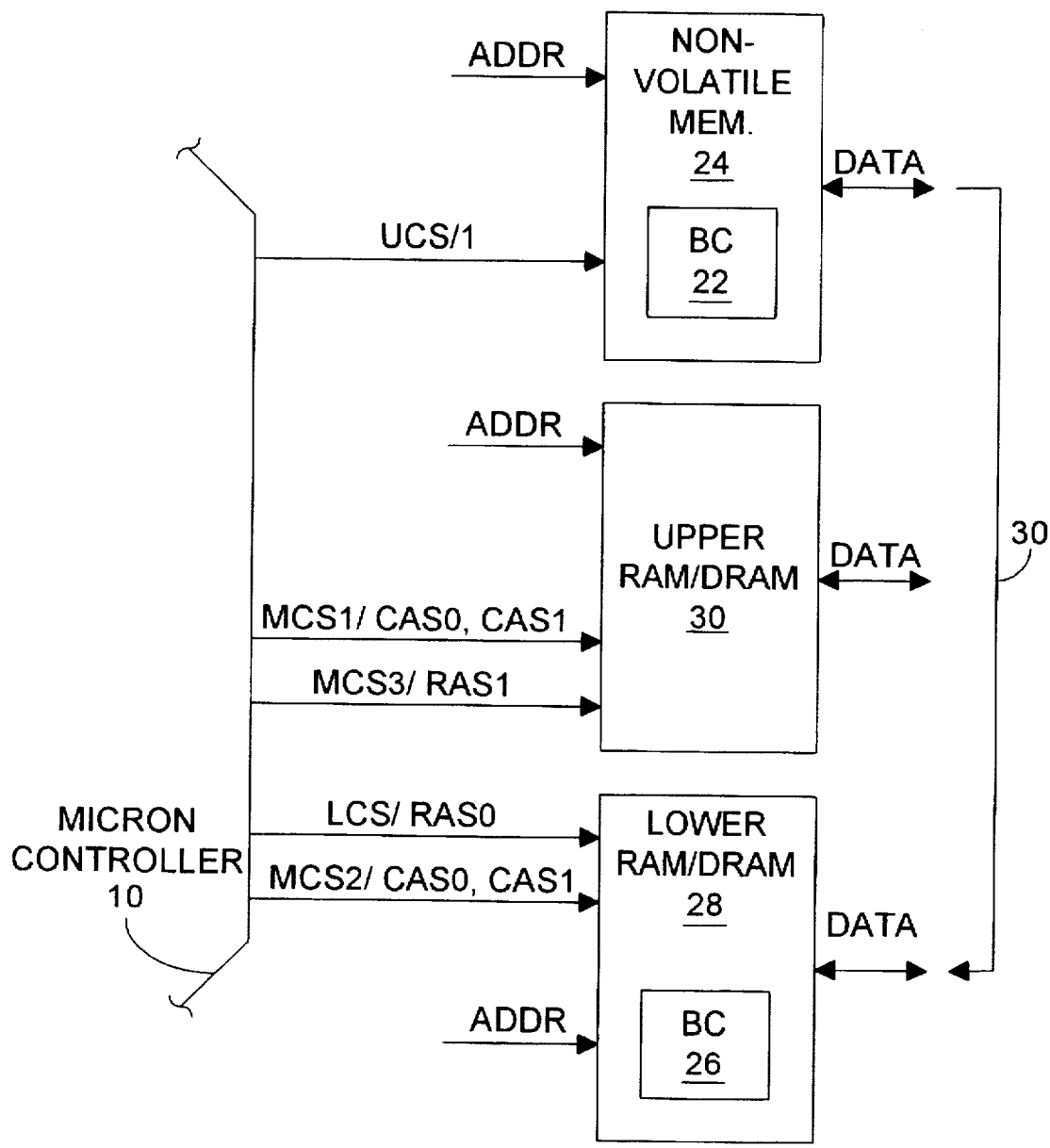
FIG. 2 is a block diagram of memory elements responsive to the mircrocontroller depending upon whether volatile memory elements are enabled in lieu of the non-volatile memory element; and, FIG. 3 is a circuit schematic of the select logic within the microcontroller of FIG. 1, depicting control signals chosen based on the status of enable signals forwarded from registers within the chip select unit.

Referring to FIG. 2, the control signals emanating from microcontroller 10 are shown. The control signals change depending upon whether the memory address space is configured with ROM, or retrofitted with RAM. In the first instance, chip select signals (UCS and LCS) are used to access the ROM and static memories available to a conventional microcontroller. It is recognized that UCS selects the upper address space reserved for a ROM, while LCS addressed the lower memory space preferably reserved for a static RAM (in the case of an Am186 microcontroller output).

After system boot-up from boot code (BC) 22 within non-volatile memory (ROM) 24, via UCS active, the computer system is initiated. Thereafter, the application code of BC 20 is copied or loaded to an address space 26 within a lower address space 28. Fetching the data from BC 22 and loading that data after system initiation into BC 26 is shown by flow arrow 30. BC 22 entails all code necessary to initiate and maintain computer system operation, including BIOS, boot operating system and applications code. BC area 26 is contained within a portion of a lower address space, specifically, a lower memory space RAM or DRAM. Lower DRAM 28 is accessed by reconfiguring the chip select lines into row and column strobe signals necessary for controlling a DRAM. Additional strobe signals available for microcontroller are reconfigured so that another DRAM element, i.e., upper memory DRAM 30 can be controlled. During reconfiguration (i.e., after system boot up or power-on reset), non-volatile memory 24 is deactivated by driving the low active UCS signal to a logic one value. To facilitate transfer of the boot code and to facilitate reconfiguration, the lower chip select (LCS) and middle chip select (MCS0-3) which are available at the output of microcontroller 10 are arranged so that row and column strobe signals emanate from those pin outputs. Those signals are then respectively forwarded to upper and lower address spaces occupied entirely by DRAM 30 and 28, respectively. The chip select signals are reconfigured to row and column strobe signals before BC 20 is copied to address space 26.

To aid in explanation, it is noted in FIG. 2 that a selection between chip select and row/column address is presented to the memory elements. However, it is understood that chip select is not needed for DRAM decode/addressing and therefore chip select signals do not forward to DRAM other than to show the reconfiguring of chip select to column and row address strobe signals to respective DRAM components.

Figure 3:
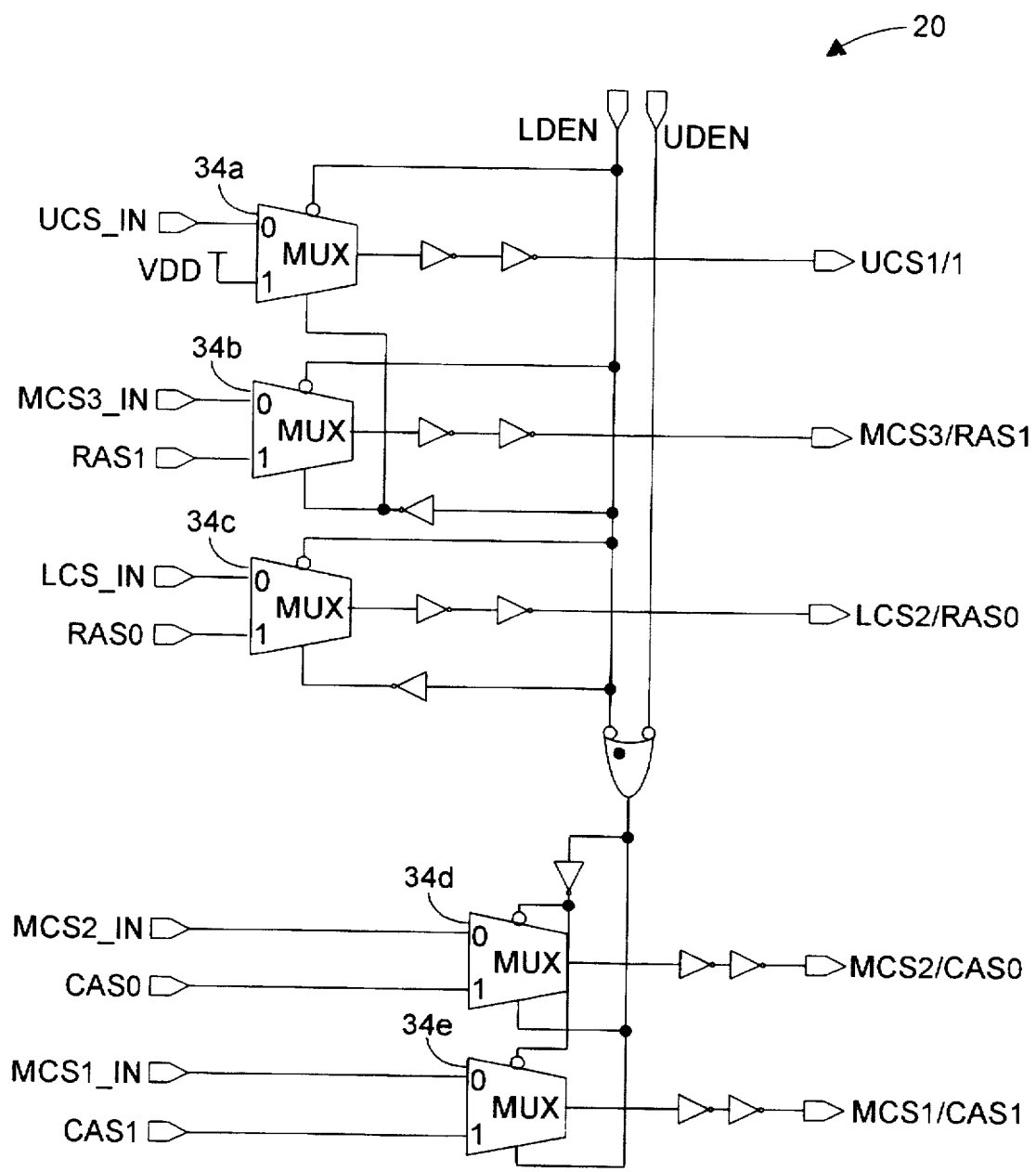

Referring to FIG. 3, a circuit schematic of select logic 20 is shown. Presented to the inputs of select logic 20 are output signals from chip select 12 and DRAM controller 14. Those signals are denoted as UCS, LCS and MCS 0-3 from chip select unit 12 and RAS0-1 and CAS0-1 from DRAM controller 14. The input signals are forwarded to multiplexers 34a through 34e, as shown. Multiplexer 34a selects UCS as its output if UDEN is a logic zero. Conversely, multiplexer 34a selects the power supply VDD if UDEN is a logic one.

If UDEN is a logic 1, then multiplexer 34b selects RAS1. If LDEN is a logic 1, then multiplexer 34c selects RAS0. If either LDEN or UDEN is a logic 1, then multiplexers 34d and 34e select CAS0 and CAS1 as their output, respectively. Accordingly, active high LDEN and UDEN are shown to activate DRAM control signals and deactivate ROM and static RAM select signals. UDEN and LDEN are set at a logic high value some time after the computer system is initiated, application programs are running, and boot code is copied from non-volatile memory to the lower address DRAM space.

Referring back to FIG. 2, address bus (ADDR) preferably comprises lines necessary for 1 Mbytes space after memory re-map. The re-mapped space is dedicated to faster, cheaper read/write memory rather than what would normally be 512 Kbyte ROM memory 24 and 512 Kbyte DRAM 28. Thus, the reconfigured memory becomes, according to one embodiment, two 512 Kbytes of RAM/DRAM 28 and 30 after system initiation. It is therefore the intent that the upper memory space normally occupied by ROM and selected by UCS become a RAM, and preferably a DRAM controllable through separate RAS and CAS output from a DRAM controller within microcontroller 10. Accordingly, the intent is to allow two separate memory devices to occupy the same chip select space, but at different times. This enable the DRAM 28 to be selected by the DRAM controller and not by the UCS. More memory space can therefore be made available for DRAM within computer systems having limited memory address space. Instead of, for example, having only 512 Kbytes of DRAM available, in a 1 Mbyte address space, the present invention re-maps so that after system initiation, an entire 1 Mbyte read/writeable space is available.

It will be appreciated to those skilled in the art having the benefit of this disclosure that this invention is believed to be capable of using any computer system employing a DRAM controller and chip select unit integrated upon a single microcontroller. It is also understood that the chip select signals and row/column strobe signals are active low. For the sake of brevity and clarity in the drawings, indication of the active low need not be presented since this is generally understood to the skilled artisan. Various modifications and changes may be made without departing from the spirit and scope of the invention as set forth in the claims. It is intended that the following claims be interpreted to embrace all such modifications and changes and, accordingly, the specification and drawings are to be regarded in an illustrative rather than a restrictive sense.

What is claimed is:

1. A computer system, comprising:

a non-volatile memory containing a program to initiate the computer system;

a chip select unit coupled to dispatch a chip select signal to the non-volatile memory device during initiation of the computer system;

a pair of random access memory devices, wherein one of said pair of random access memory devices receives at least a portion of the program immediately after initiation; and a random access memory controller coupled between the chip select unit and the non-volatile memory as well between the chip select unit and the random access memory devices, wherein the memory controller deactivates the chip select signal to the non-volatile memory while activating control signals to one of said pair of random access memory devices during a time after which the other of said pair of random access memory devices receives the copy.

2. The computer system as recited in claim 1, wherein said control signals comprise row and column control signals.

3. The computer system as recited in claim 1, wherein said control signals comprise static random access memory device control signals.

4. The computer system as recited in claim 1, wherein the chip select unit comprises a pair of registers having an output coupled to the memory controller for deactivating the chip select signal and activating row and column control signals dependent upon a logic state of a bit within said pair of registers.

5. The computer system as recited in claim 4, wherein the memory controller comprises select logic coupled to the output from the pair of registers for dispatching the row and column control signals if the logic state of the bit is set high.

6. The computer system as recited in claim 5, wherein the select logic comprises a first multiplexer having the chip select signal as one input and a power supply as another input for passing either the chip select signal or the power supply to the non-volatile memory depending upon the logic state of the bit within one said pair of registers.

7. The computer system as recited in claim 6, wherein the select logic comprises a plurality of multiplexers beyond the first multiplexer, each of the plurality of multiplexers are coupled to forward the row and column control signals to said pair of memory devices depending upon the logic state of the bit within said pair of registers.

8. The computer system as recited in claim 1, wherein the pair of random access memory devices and the random access memory controller comprises a dynamic random access memory device and a dynamic random access memory controller, respectively.

9. The computer system as recited in claim 1, wherein the chip select unit and the memory controller are embodied upon a single monolithic substrate.

10. A method for re-mapping memory within a computer system, comprising:

booting the computer system from an upper mapped memory address space occupied by a non-volatile memory;

asserting row and column address strobe signals to a lower mapped memory address space occupied by a volatile memory;

loading at least a portion of data within the non-volatile memory to a portion of the lower mapped address space occupied by the volatile memory; and disabling the non-volatile memory.

11. The method as recited in claim 10, wherein booting comprises resetting or powering on the computer system.

12. The method as recited in claim 10, wherein copying comprises fetching the portion of data by an execution unit and loading the fetched portion of data into the portion of lower mapped address space.

13. The method as recited in claim 10, wherein the non-volatile memory comprises read only memory, and wherein the volatile memory comprises dynamic random access memory.

14. The method as recited in claim 10, wherein disabling the non-volatile memory comprises de-asserting a chip select signal forwarded to the non-volatile memory.

15. The method as recited in claim 10, further comprising asserting row and column address strobe signals to an upper mapped address space of the volatile memory.

16. The method as recited in claim 15, wherein the lower and upper mapped address space comprise separate random access memory elements.

17. The method as recited in claim 16, wherein the separate dynamic random access memory elements are bifurcated on separate semiconductor substrates.

* * * * *